United States Patent
King, Jr. et al.

(10) Patent No.: US 6,510,865 B2
(45) Date of Patent: Jan. 28, 2003

(54) TAP AND SADDLE FOR FORMING A HINGED COUPON

(76) Inventors: Lloyd Herbert King, Jr., 4 Deer Field Ridge Rd., Chesterfield, MO (US) 63005; Glenn M. Hoffman, 630 Top Notch La., Eureka, MO (US) 63025

( * ) Notice: Subject to any disclaimer, the term of this patent is extended or adjusted under 35 U.S.C. 154(b) by 0 days.

(21) Appl. No.: 09/785,684

(22) Filed: Feb. 16, 2001

(65) Prior Publication Data

US 2001/0032667 A1 Oct. 25, 2001

Related U.S. Application Data

(60) Provisional application No. 60/183,612, filed on Feb. 18, 2000.

(51) Int. Cl.[7] ............................................. F16K 43/00
(52) U.S. Cl. ..................... 137/318; 137/15.14; 285/197; 408/67; 408/102; 408/138
(58) Field of Search ............................ 137/318, 15.14, 137/15.13; 285/197; 408/67, 102, 137, 138, 223, 227

(56) References Cited

U.S. PATENT DOCUMENTS

| | | | | |
|---|---|---|---|---|
| 1,370,739 A | * | 3/1921 | Gay | 137/318 |
| 3,495,615 A | | 2/1970 | Ehrens et al. | 137/318 |
| 3,509,905 A | * | 5/1970 | Mullins | 137/318 |
| 3,554,217 A | * | 1/1971 | Ehrens | 137/318 |
| 3,580,269 A | * | 5/1971 | Ehrens | 137/318 |
| 3,756,267 A | | 9/1973 | Hutton | 137/318 |
| 3,762,263 A | * | 10/1973 | Bocceda | 137/318 |
| 4,112,944 A | * | 9/1978 | Williams | 137/318 |
| 4,364,406 A | * | 12/1982 | Bohlin | 137/318 |
| 4,434,809 A | * | 3/1984 | Rogstadius | 137/318 |
| 4,522,339 A | * | 6/1985 | Costa | 137/318 |
| 4,540,011 A | * | 9/1985 | Croxford et al. | 137/318 |
| 4,574,443 A | | 3/1986 | Persak et al. | 29/157.1 |
| 5,076,318 A | | 12/1991 | Fedora | 137/318 |
| 5,105,844 A | | 4/1992 | King, Sr. | 137/15 |
| 5,241,981 A | | 9/1993 | Ahern | 137/318 |
| 5,345,964 A | | 9/1994 | Friedel | 137/318 |
| 5,425,395 A | | 6/1995 | Brennan | 137/318 |
| 5,577,529 A | | 11/1996 | Katz | 137/318 |
| 5,609,181 A | * | 3/1997 | Evans | 137/318 |
| 5,694,972 A | | 12/1997 | King | 137/318 |
| 5,732,732 A | | 3/1998 | Gross et al. | 137/318 |
| 5,896,885 A | | 4/1999 | Svetlik | 137/5 |
| 5,964,240 A | | 10/1999 | Granovski | 137/15 |
| 5,967,168 A | | 10/1999 | Kitani et al. | 137/15 |
| 6,012,475 A | | 1/2000 | Taylor et al. | 137/15 |
| 6,216,723 B1 | | 4/2001 | King | 137/318 |

* cited by examiner

*Primary Examiner*—George L. Walton
(74) *Attorney, Agent, or Firm*—Jacobson & Johnson

(57) ABSTRACT

A hollow tap having an axially outward extending cutting tooth so that when the cutting tooth is brought into rotational pressure engagement with a resilient tubing the cutting tooth cuts a hole partially through the resilient tubing leaving a coupon hingedly but securely attached to the resilient tubing to maintain the coupon in an out-of-the-way condition within the resilient tubing. Continued rotation of the tap within a saddle brings a sealing surface on the cutting tube into fluid tight seal with the resilient tubing to provide a branch outlet to the resilient tubing though the tap.

32 Claims, 4 Drawing Sheets

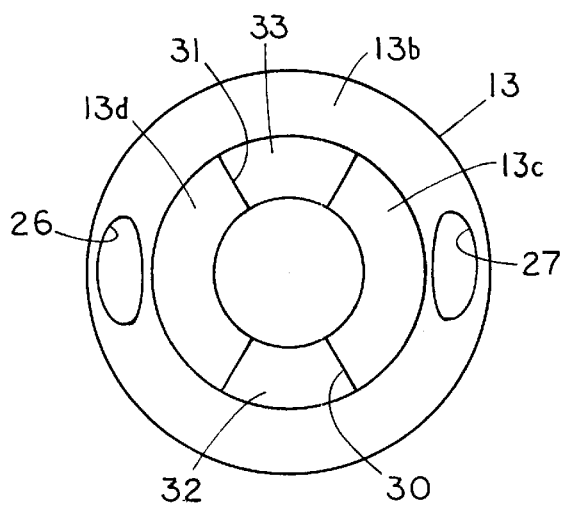
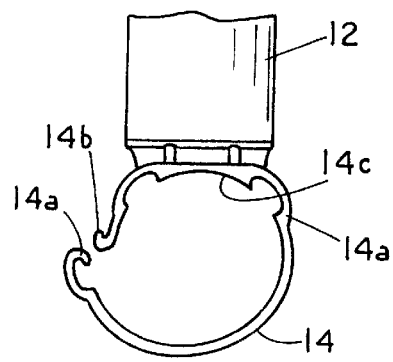
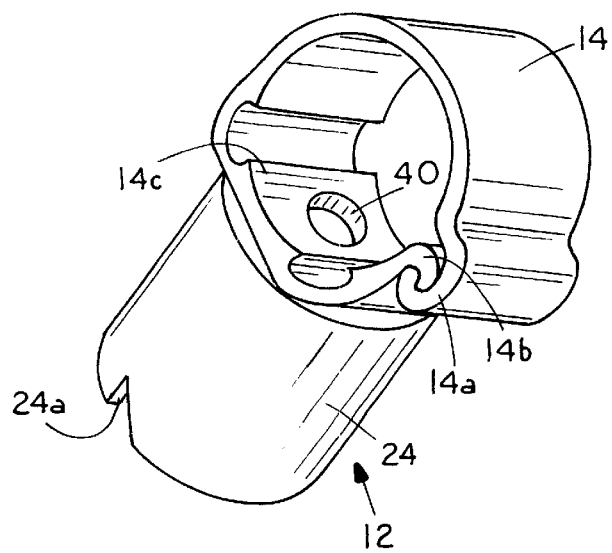
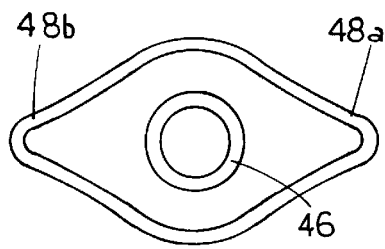

TAP AND SADDLE FOR FORMING A HINGED COUPON

CROSS REFERENCE TO RELATED APPLICATIONS

This application claims the benefit of provisional application Ser. No. 60/183,612 titled Coupling cutter for forming hinged coupon, which was filed Feb. 18, 2000.

FIELD OF THE INVENTION

This invention relates generally to branch forming attachments and, more specifically, to a tap having a cutting tube for a one-step connection of a branch line to a main line without the aid of tools.

BACKGROUND OF THE INVENTION

The concept of forming branch attachments to rigid and plastic tubing is known in the art. Generally, pipe saddles are fastened around a pipe so that one can connect a branch tubing to a main tubing. Attaching a branch tubing to a main tubing often requires numerous steps and sometimes it is difficult to adequately seal the junction between the branch tubing and the main tubing.

The attaching device usually comprises two parts, a tap for forming the opening in the pipe and a saddle for holding the main tubing and the branch tubing in fluid communication. In one application shown in U.S. Pat. No. 5,105,844 a tap or cutter having a through passage both cuts a hole and forms a side attachment for the pipe. In the cutter shown in U.S. Pat. No. 5,105,844 a coupon or plug is cut free of the pipe and is frictionally retained within the cutter so as not to interfere with or block the passageway in the pipe.

In the invention shown in U.S. Pat. No. 5,105,844 the pipe clamp comprises two identical parts that when snapped together form a threaded recess to allow a user to threadingly drive the coupon cutter through the plastic pipe and position a branch pipe in fluid communication with the main tubing.

The self tapping branch attachments are particularly well suited for underground irrigation systems that require in situ forming of branch lines to a main tubing, but they are also useful in other systems and other locations that use rigid, resilient or flexible tubing.

Other branching concepts use a piercing of the main pipe with a pointed tap. One example of such type of a tap is shown in U.S. Pat. No. 3,891,150 that shows an irrigation system that uses a probe with a tapered point that is forced though the sidewall of the main pipe. Another embodiment using a tapered point is shown in U.S. Pat. No. 5,694,972 which shows a saddle tee for an irrigation line and a stem with a tapered point that is punched through the plastic pipe. In the piercing method the tubing can be severely distorted in the region at the junction of the two pipes which can cause leakage.

The pipe clamp used in the U.S. Pat. No. 5,694,972 is also shown in U.S. Pat. No. 4,291,855 and comprises two segments that are hinged at an intermediate point to allow the segments to spread apart and receive a pipe.

In contrast, the present invention has a hollow tap having a cutting tooth is used to form the side attachment passage but instead of cutting the coupon free of the tubing and retaining the coupon in the cutter the coupon is only partially severed from the pipe. The coupon itself forms a living hinge connection to the pipe which retains the coupon in the pipe. The partially severing of the coupon minimizes the distortion of the pipe at the junction of the main pipe and the branch pipe, which can lessen the opportunity for leakage. The partial severing and retaining of the coupon as an integral living hinge ensures that the coupon will not interfere and block any outlet passages in the main tubing. In the event a rigid tubing, such as PVC, is employed with the present invention the tap will cut the coupon free of the tubing since the more rigid PVC will break rather than flex. In this case the coupon can be flushed free of the tubing.

SUMMARY OF THE INVENTION

Briefly, the invention comprises a tap having an axially outward extending cutting tooth so that when the cutting tooth is brought into rotational pressure engagement with a resilient tubing the cutting tooth cuts a hole partially through the resilient tubing leaving a coupon integrally hinged but securely attached to the resilient tubing to maintain the coupon in an out-of-the-way condition within the passageway of the resilient tubing. Continued rotation of the tap within a saddle brings a sealing surface on the cutting tube into a fluid tight seal with the sidewalls of the cut opening in the resilient tubing to provide a branch outlet to the resilient tubing though the tap with a minimum of pipe distortion around the junction of the main pipe and the sealing surface of the tap. By rotation of the tap through the pipe one avoids the distortion produced by radially piercing the pipe with a sharp point.

DESCRIPTION OF THE PRIOR ART

U.S. Pat. No. 1,181,131 is a U-bolt pipe saddle with an extra piece required between the main and branch tubing to secure the fit;

U.S. Pat. No. 3,162,211 shows a device with a cutting needle for forming a hole in a pipe.

U.S. Pat. No. 3,240,434 shows an irrigation nozzle with a hollow point that is inserted through an opening in the pipe.

U.S. Pat. No. 3,343,724 shows a similar tap a tap with a needle point and a side port for tapping into the side of a sealed plastic bag.

U.S. Pat. No. 3,349,792 shows a tapping tee and valve.

U.S. Pat. No. 3,448,758 shows a refrigerator service valve that uses a hollow point that is cut at an angle to insert through a pipe.

U.S. Pat. No. 3,460,715 shows a tap with a needle point and a side port for tapping into the side of a sealed plastic bag.

U.S. Pat. No. 3,471,176 is a pipe saddle which does not specify a method for creating the hole for the branch tubing. Most likely, it employs a hand tool;

U.S. Pat. No. 3,891,150 is a pipe saddle not suited for high-pressure or high-wear situations;

U.S. Pat. No. 3,920,937 shows a drip irrigation system which includes a saddle and sharp pointed tube for extending through a pipe.

U.S. Pat. No. 3,973,732 shows a quick fitting that is forced through the wall of the tubing.

U.S. Pat. No. 4,239,265 is a pipe saddle requiring four steps and four different parts as well as a sealing ring;

U.S. Pat. No. 4,291,855 shows a pipe clamp having hinged portions for securing around a pipe.

U.S. Pat. No. 4,789,189 is a metal pipe saddle requiring a cutting tool to make a branch hole, and another device to reseal the hole.

U.S. Pat. No. 5,105,844 shows a two step branch forming attachment with a cutter for cutting a coupon from a main pipe.

U.S. Pat. No. 5,169,177 shows a saddle for mounting around a tube.

BRIEF DESCRIPTION OF THE DRAWINGS

FIG. 5 is an end view of the of the cutting end of the cutting tube of FIG. 1;

FIG. 6 is end view of the saddle strap and latch in the unlatched condition;

FIG. 7 is a partial cut-away front elevation view of the tap of FIG. 1;

FIG. 8 is a top view of the tap shown in FIG. 7;

FIG. 9 is perspective view of the saddle of FIG. 1 in a latched condition;

DESCRIPTION OF THE PREFERRED EMBODIMENT

Figure 1:
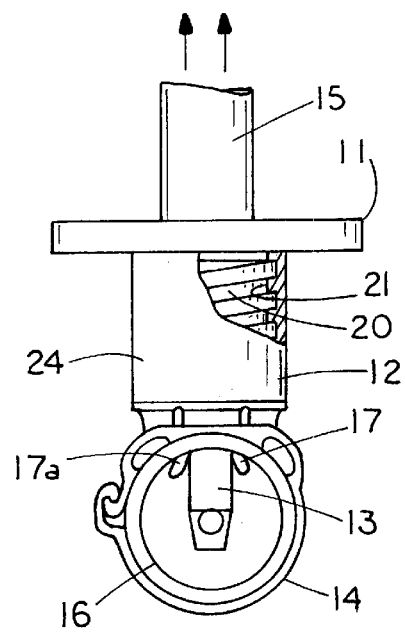
FIG. 1 is an end view of the coupon cutter and saddle secured to a main pipe.
Figure 2:
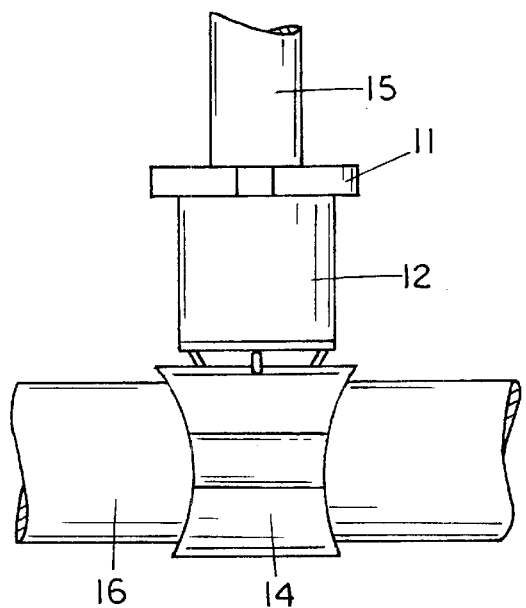
FIG. 2 is side view of the coupon cutter and saddle of FIG. 1.

FIG. 1 shows a partial end view of a tap 11 positioned within a saddle 12 that has a flexible strap or band 14 that extends circumferentially around a resilient tubing 16 and FIG. 2 shows a side view of tap 11 rotatingly engaged in saddle 12. Tap 11 includes a male thread 20 for rotating engagement with a female thread 21 located in housing 24 of saddle 12. A branch tube 15 extends outwardly from resilient tubing 16. Tap 11 includes a cutting tube 13 that extends through a sidewall of resilient tubing 16. A first integral coupon 17a extends inwardly from resilient tubing 16 and a second integral coupon 17 extends radially inward from the sidewall of resilient tubing 16. In the embodiment shown the coupons 17 and 17a are integrally connected to resilient tubing 16 and are formed from a part of resilient tubing 16. That is, the cutting tube 13 partially cuts a hole through the sidewall of resilient tubing 16 and then forces the partially-severed coupon or coupons outwardly away from the cutting tube without severing the coupon from the tubing 16.

Figure 3:
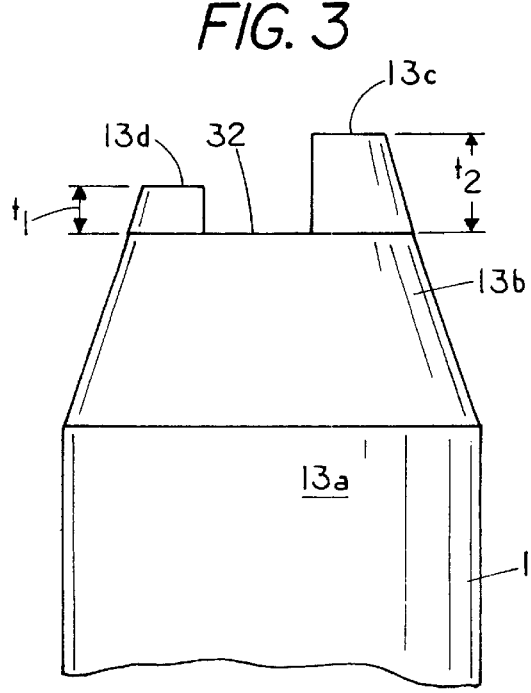
FIG. 3 is a front elevation view of the cutting end of the cutting tube of FIG. 1.
Figure 4:
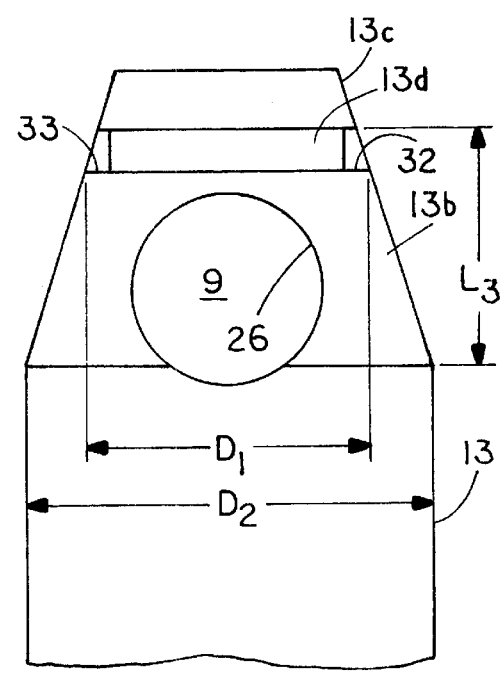
FIG. 4 is a side elevation view of the cutting end of the cutting tube of FIG. 1.

Reference to FIG. 3 shows an enlarged elevation view of the end of cutting tube 13. Cutting tube 13 includes a cylindrical sealing surface 13a which adjoins one end of a frusto conical section 13b. The opposite end of frusto conical section 13 includes a first circumferential, axially outwardly extending tooth 13c and a second circumferentially axially outwardly extend tooth 13d. In the embodiment shown in FIG. 3 the tooth 13c extends axially outwardly a distance t2 from tooth root surface 32 and tooth root surface 33 with the dimension $t_2$ greater than the distance $t_1$ that tooth 13d extends outwardly. Both teeth have an arcuate shape and follow a portion of the annular end of cutting tube FIG. 4 shows a side view of cutting tube, which is shown in FIG. 3, revealing an inlet 26 for entry of fluids into the passageway 9 located within hollow cutting tube 13. The cutting teeth 13c and 13d extend upwardly with the angle of the cutting teeth flowing from the converging angle of the frusto conical section 13b. The length $L_3$ of the frusto conical section and the diameter expansion $D_1$ to $D_2$ is such that the resilient tubing that is to receive the cutting tube is sufficiently expanded to create a radial inward pressure to seal the resilient tubing to the cutting tube but not sufficiently great so as to distort the resilient tubing and create opportunities for leakage. An operator can select the amount of diametrical expansion of the tubing based on the type of resilient tubing as well as the size of the cutting tube in order to obtain maximum sealing capacity. The length of the taper can be selected based on the force needed to expand the resilient tubing. For example, a longer taper provides a gradual expansion of the hole and requires less force while a shorter taper provides for an abrupt expansion of the hole and requires greater force. In operation of the tap one of the teeth 13c and 13d cuts the tubing while the other assists in forcing the tooth off to the side in a hinged coupon.

FIG. 5 shows an end view of the cutting tube 13 revealing the cutting tooth 13c extending circumferentially around the end of cutting tube 13 to form a arcuate teeth having a partial annular shape. Located on one end of cutting tooth 13c is a leading edge 30 that forms a cutting edge for rotational penetration of the cutting tooth 13c through a sidewall of a resilient tubing. Similarly, positioned on the opposite side and extending in a partial circumferential distance around the end of cutting tube 13 is the second cutting tooth 13d which has a leading edge 32 that forms a cutting edge for rotational penetration of the cutting tooth 13c through a sidewall of the resilient tubing. In the embodiment shown the curved outward ends of cutting teeth 13c and 13d are shown with a flat edge or blunt edge.

FIG. 6 shows an end or side view of one-piece saddle 12 showing the strap 14 in an unlatched condition with latch member 14a in disengagement with latch member 14b. The strap or band 14 comprises two portions, a flexible material which extends upward to 14e which is enlarged and reinforced to provide a stiffer section to maintain the curved shape of the elongated sealing seat 14c. However, the portion of the band extending clockwise from reinforcing member 14e retains the flexibility allowing the band 14 to slip over the exterior of a resilient tubing. Once band 14 is opened the resilient tubing can be laterally positioned within the interior of band 14. Once in position the band 14 can be secured to hold the band on the resilient tubing. It has been found that the band or strap 14 can be made from plastic materials such as polypropylene.

FIG. 7 shows an isolated front view of a one-piece tap 11 showing drum 44 having an external male thread 45 and an internal female thread 46. Cutting tube 13, which is concentric with drum 44, extends axially outward from drum 44 with one end integral with drum 44 and the other end containing integral cutting tooth 13c proximate inlet 27. The external male threads permit threaded engagement with the saddle and the internal threads 46 permit one to secure a branch pipe to tap 11. Located on the top of tap 11 is a handgrip 48.

FIG. 8 shows a top view of tap 11 showing handgrip 48 includes a pair of ears 48a and 48b to enable a user to grasp and rotate tap 11 by hand. In operation of tap 11 a user grasps handgrip 48 with one hand and rotates handgrip 48 to screw thread 44 into the housing which forces cutting tube 13 axially downward into a sidewall of a resilient tubing. Continued rotation of handgrip 48 causes cutting tube 13 to cut a partial hole through a resilient tubing. It is not fully understood how the cutting tooth creates a hinged coupon or coupons on the inside of the resilient tubing. In operation of the tool usually the longer tooth cuts the tubing while the following tooth rolls the coupon clear of the cutting tooth to leave a hinged coupon therein; however, the dynamics of penetration are such that either tooth could cut or roll the material to form the hinged coupon.

In any event the cutting tube 13 results in the coupon from the resilient tubing being deflected inward away from the cutting tooth. This partial severing of the coupon ensures that the coupon can be retained in an out-of-the-way condition. As the resilient tubing is flexible the coupon forms its own integral hinge allowing the coupon to be forced inwardly into the resilient tubing as shown in FIG. 1. Surprisingly, the presence of the coupon integrally hinged from a sidewall of the resilient tubing does not interfere with forming a fluid tight seal between the cylindrical sealing surface and the resilient tubing. In addition since the amount of the distortion of the resilient tubing is decreased by the forming of an opening in the sidewall of the resilient tubing the chances of distortion producing leaks are reduced.

FIG. 9 is a pictorial view of the one-piece saddle 11 revealing the housing 24 having a triangular shaped, locking stop 24a thereon for engagement a tab on the tap. The seating region 14c is shown extending crosswise across the saddle with an opening 40 therein for cutting tube 13. A hook shaped latch 14b and hook shaped latch 14a are shown in the latched condition. Latch 14b and 14a can be unlatched by flexing of strap 14.

Figure 10:
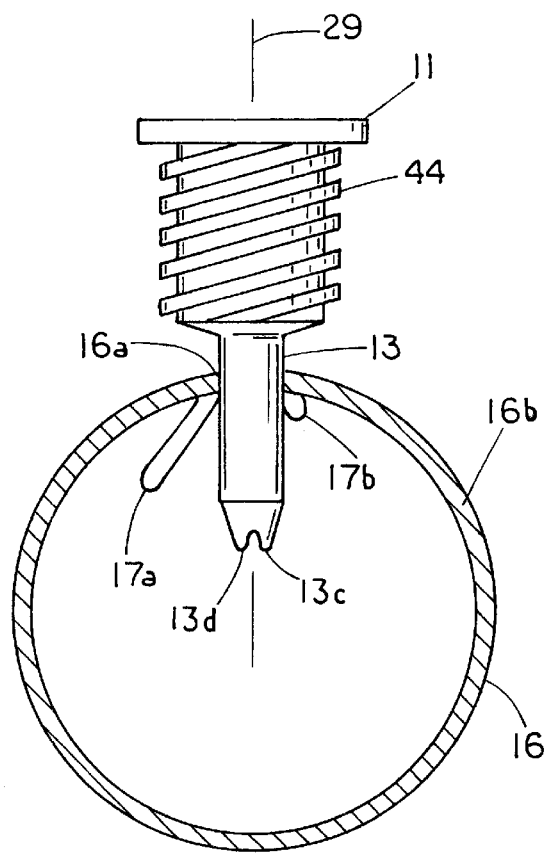
FIG. 10 is an elevation showing the cutting tube and the hinged coupons.

In order to illustrate how tap 11 forms engagement with a resilient tubing FIG. 10 shows tap 11 without the saddle 12 present. Normally, saddle 12 holds tap 11 in the position shown in FIG. 10 and is used to drive the tap into the resilient tubing. To position tap 11 in the position shown in FIG. 10 one would rotate tap 11 until the cutting teeth 13c and 13d penetrated the resilient sidewall 16b of resilient tubing 16. In the condition shown in FIG. 10 is noted that a first integral coupon 17a hinges inwardly into resilient tubing 16 and a second integral coupon 17b hinges inwardly inward to resilient tubing 16. The number of hinged coupons can vary and in some cases only a single hinged coupon with be formed and in other cases a plurality of hinged coupons are formed. With the hinged coupons extending inward the cylindrical sealing surface 13 forms a circumferential seal 16a around the sidewall the opening in sidewall 16s of resilient tubing 16. That is the resilient tubing 14 compressively squeezes against cylindrical sealing surface 16 with sufficient compression to form a fluid tight seal between the resilient tubing and the cylindrical sealing surface 13. Surprisingly, the hinged coupons which extend from the sidewall of the resilient tubing do not interfere with the forming of the fluid tight seal. As the opening in the side wall is circular the tubing can squeeze more uniformly around the cutting tube 13 than if the hole were punched through the tubing, thus providing less distortion, which can lead to premature leaks.

Figure 11:
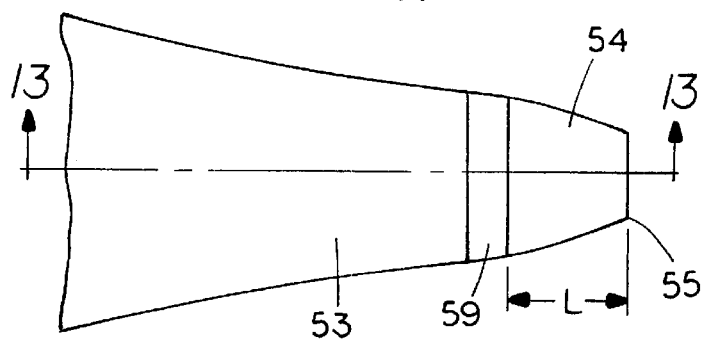
FIG. 11 is a side view of one embodiment of a cutting tube.

FIG. 11 shows an alternate preferred embodiment a cutting tube for generating hinged coupon. Cutting tube 53 contains a single cutting tooth 54 that extends a distance L outward from frusto conical section 59. In the embodiment shown the cutting tube 53 includes a slight diametrical expansion to further aid informing a fluid tight seal between the cutting tube and the resilient tubing.

Figure 12:
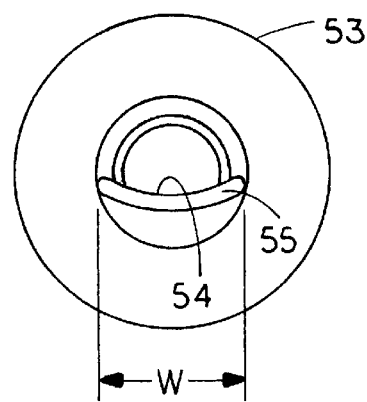
FIG. 12 is an end view of the cutting tube of FIG. 11.

FIG. 12 shows an end view of cutting tube 53 showing the curved single cutting tooth 55 extending circumferential around a portion of the end of the cutting tube 53. The Length of the cutting tooth is identified by the dimension W.

Figure 13:
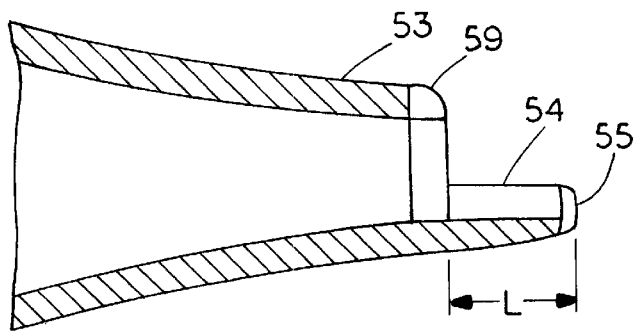
FIG. 13 is a side view of the cutting tube of FIG. 11.

FIG. 13 shows a sectional view of cutting tube 53 taken along lines 13—13 of FIG. 11. Single tooth 54 extends axially outwardly with the edge of tooth identified by numeral 55. The cutting tube 53 can be attached to the drum as shown in FIG. 7 to provide for an operator to rotate cutting tool 53 into the resilient tubing.

Figure 14:
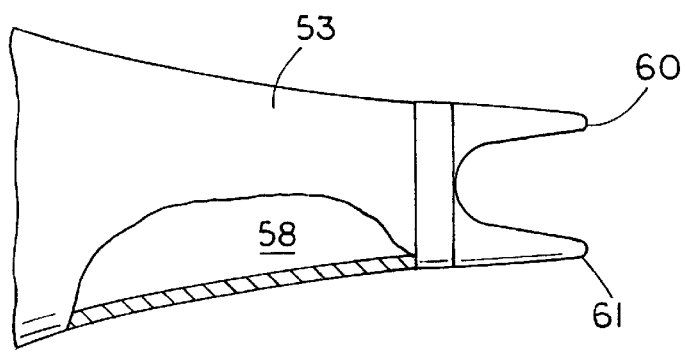
FIG. 14 is a partial side view of a cutting tube with two cutting teeth.

FIG. 14 shows an alternate preferred embodiment wherein cutting tube 53 incudes a first cutting tooth 60 and a second cutting tooth 61 which are of substantially the same length. In the embodiment shown a coupon can be partially severed; however, the rotation of the cutting tube should be at sufficiently slow rate so as not to sever the coupon before the coupon is forced out of the way.

Figure 15:
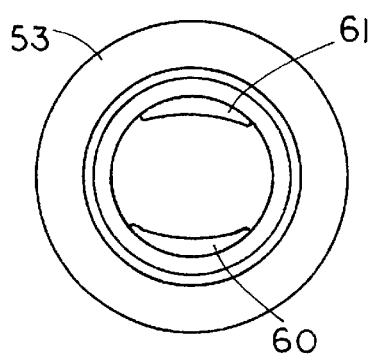
FIG. 15 is an end view of the cutting tube of FIG. 14.

FIG. 15 shows that each of the curved cutting teeth 60 and 61 extend partially around the circumferential end of cutting tube 53.

Figure 16:
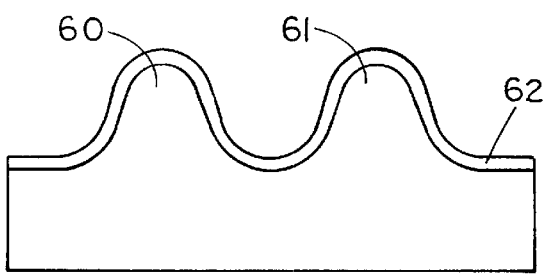
FIG. 16 shows the cutting tube laid out in a plane view.

FIG. 16 is a plane view of the cutting tool teeth 60 and 61 as they would appear if the cutting tool teeth were unwound from the cylindrical cutting tube and laid in a flat condition. In the embodiment shown the edge 62 is slightly tapered.

In operation of the coupon cutter shown in FIGS. 14–16 the cutting teeth 60 and 61 extend axially outward to provide an undulating cutting area. It has been found that by using an extending cutting tooth and hand rotation one can rotationally carve a hole in a resilient tubing one does not fully cut through the resilient tubing leaving an integral hinged coupon or coupons. The actual speed of rotation of the cutting tube 53 depends on the material and the thickness of the material and can be readily determined by forming a hole in a piece of waste pipe. In most instance one can not turn the cutting tube fast enough to completely sever the coupon. Once the person understands the needed rate of rotation it is easy for the user to cut the coupons with an integral hinge using the embodiment of FIGS. 14–16. The result of the cutting effort is that a coupon that would normally be expected to cut free from the resilient tubing remains attached to the tubing. As the resilient tubing is flexible the coupon attachment forms a living hinge that securely maintains the coupon in an out-of-the-way condition when the neck 53 is forced through the opening in the main tubing. As previously mentioned FIG. 1 illustrates that in some condition the coupon may split into two parts and a portion of the coupon 17 can be hinged from one side and a second portion of the coupon 17a can be hinged from another area of the tube.

While the present invention is suited for use in forming branch tubing in resilient tubing in an alternate method the tubing could be non-resilient so that the coupon or coupons might break free of the tubing. If the coupons break as the hole is cut the coupons cut while forming the openings in the pipe could be flushed from the line when the line is flushed prior to actual use of the system.

We claim:

1. A tap for connection to a pipe line comprising:
   a drum;
   a handgrip extending from said drum to enable a person to grasp and rotate said drum;
   a hollow cutting tube, said hollow cutting tube having a first end connected to said drum and a second extending outwardly from said drum; said second end of said tube having an inlet for passage of a fluid through said hollow cutting tube, said second end of said tube having a an axially offset cutting tooth and a second tooth with each tooth extending partially around, the end of said hollow cutting tube, said first cutting tooth projecting outward from said second end so that when said second end of said tube is rotationally driven through a sidewall of a plastic pipe said first cutting tooth partially severs a coupon therefrom while the second tooth tolls thethe coupon into a hinged out-of-the-way condition.

2. The tap of claim 1 wherein the second tooth is a second cutting tooth.

3. The tap of claim 2 wherein the second cutting tooth extends outwardly from the end of said cutting tube less than said first cutting tooth and one of said cutting teeth cuts and the other of said cutting teeth rolls the coupon into a hinged condition.

4. The tap of claim 1 wherein the end of said cutting tube has a cylindrical sealing surface and the pipe comprises a resilient material.

5. The tap of claim 1 wherein the second end of said tube has a frusto conical section for expanding a cut opening in the resilient tubing.

6. The tap of claim 1 wherein the drum includes an internal female thread and an external male thread.

7. The tap of claim 1 wherein the second end of said cutting tube extends substantially perpendicular to a central axis of said cutting tube.

8. The tap of claim 1 wherein the cutting tube comprises glass-reinforced nylon.

9. The tap of claim 1 wherein the first cutting tooth has an arcuate shape and extends less than half way around a peripheral end of the cutting tube.

10. The tap of claim 1 wherein the cutting tube includes a first inlet and a second inlet located proximate the second end of said cutting tube to form fluid communication thought a passage in the cutting tube.

11. The tap of claim 1 wherein handgrip includes a first and second ear for a user to grasp thereon.

12. The tap of claim 1 wherein the cutting tube includes a frusto conical section that converges smoothly from the end of said cutting tube carrying a cutting tooth to the cylindrical sealing surface on said cutting tube.

13. The tap of claim 11 wherein the handgrip has an opening therein to provide threading access to a female thread to enable securement of a branch line thereto.

14. The tap of claim 1 including a saddle for engaging a tubing, said saddle having a set of female threads for rotatingly engaging said tap as said tap is rotated about a central axis.

15. The tap of claim 14 wherein the saddle includes a flexible strap for circumferential securement.

16. The tap of claim 15 wherein the saddle includes a pipe engaging seat.

17. The tap of claim 14 wherein the saddle includes a housing having a latch for preventing accidental rotational disengagement of the tap therefrom.

18. The tap of claim 14 wherein said flexible strap includes a first latch member and a second latch member for circumferential engagement with each other.

19. The tap of claim 14 wherein said first latch member and said second latch member comprises hook shaped members.

20. A method of attaching a branch tubing to a main tubing comprising the steps of:
   securing a saddle to a resilient tubing;
   placing a rotatable tap having a peripheral cutting tooth in the saddle;
   cutting a hole partially through the resilient tubing by rotating the tap so that rotation of the cutting tooth about a central axis of the rotatable tap partially severs a coupon from the resilient tubing to leave the coupon partially attached to the resilient tubing;
   extending the hollow cutting tube through the partially cut hole to bend the coupon to an out-of-the-way condition with the partially attachment of the coupon to the resilient tubing forming a living hinge to retain the coupon within the resilient tubing; and
   maintaining the tap in contact with the resilient tubing to form a fluid tight seal between the resilient tubing and the tap.

21. The method of claim 20 including the step of placing a saddle around the resilient tubing comprises placing a one-piece saddle around the resilient tubing.

22. The method of claim 21 including the step of latching the saddle around the resilient tubing.

23. The method of claim 21 wherein cutting a hole comprises the step of rotating a cutting tube having an axially extending tooth against the resilient tubing.

24. The method of claim 21 wherein the cutting of a hole comprising rotating a tap into a female thread in the saddle to axially extend a cutting tube of the tap through the resilient tubing.

25. The method of claim 21 including the step of radially expanding the resilient tubing around the cutting tube after cutting a hole through the resilient tubing.

26. The method of claim 25 including the step of latching the tap to the saddle to prevent the tap from accidentally coming free of the saddle.

27. The method of claim 25 including the step of forming an inlet in the cutting tube to allow a fluid to flow through the cutting tube.

28. The method of claim 25 including the step of flexing a band of the saddle to place the band around a resilient tubing.

29. The method of claim 25 including the step of making the tap of glass filled nylon.

30. The method of claim 25 including the step of forming two teeth on said cutting tube with one of said teeth extending axially outward farther than the other.

31. The method of claim 25 including the step of forming a circumferential cutting tooth on the cutting tube.

32. The method of claim 25 including the step of extending a cylindrical sealing surface on the cutting tube into sealing engagement with a side wall of the resilient tubing.

* * * * *